(12) United States Patent
Cady et al.

(10) Patent No.: US 11,609,704 B2
(45) Date of Patent: Mar. 21, 2023

(54) VISUALIZATION OF OUTLIERS IN A HIGHLY-SKEWED DISTRIBUTION OF TELEMETRY DATA

(71) Applicant: NetApp, Inc., Sunnyvale, CA (US)

(72) Inventors: Tyler W. Cady, Denver, CO (US); Joseph R. Thomas, III, Broomfield, CO (US)

(73) Assignee: NetApp, Inc., San Jose, CA (US)

( * ) Notice: Subject to any disclaimer, the term of this patent is extended or adjusted under 35 U.S.C. 154(b) by 344 days.

(21) Appl. No.: 17/070,484

(22) Filed: Oct. 14, 2020

(65) Prior Publication Data

US 2022/0113888 A1    Apr. 14, 2022

(51) Int. Cl.
| | | |
|---|---|---|
| *G06F 11/07* | (2006.01) | |
| *G06F 3/06* | (2006.01) | |
| *G06F 9/50* | (2006.01) | |
| *G06K 9/62* | (2022.01) | |
| *H04L 43/045* | (2022.01) | |
| *G06F 11/30* | (2006.01) | |
| *H04L 9/40* | (2022.01) | |
| *G06F 17/18* | (2006.01) | |

(52) U.S. Cl.
CPC .......... *G06F 3/0653* (2013.01); *G06F 3/0604* (2013.01); *G06F 3/067* (2013.01); *G06F 9/5027* (2013.01); *G06F 11/0703* (2013.01); *G06F 11/3065* (2013.01); *G06K 9/6284* (2013.01); *H04L 43/045* (2013.01); *G06F 17/18* (2013.01); *H04L 63/1425* (2013.01)

(58) Field of Classification Search
CPC ...... G06F 11/07; G06F 11/30; G06F 11/0703; G06F 11/3065; G06F 3/0653; G06K 9/6284; H04L 43/045
See application file for complete search history.

(56) References Cited

U.S. PATENT DOCUMENTS

| | | | |
|---|---|---|---|
| 9,128,995 B1* | 9/2015 | Fletcher | G06F 3/04817 |
| 11,093,518 B1* | 8/2021 | Lu | G06F 11/3476 |
| 2016/0140605 A1* | 5/2016 | Develin | H04L 67/535 |
| | | | 705/14.45 |
| 2018/0121248 A1* | 5/2018 | Delaney | G06F 9/45558 |
| 2020/0334540 A1* | 10/2020 | Borra | G06K 9/6284 |

(Continued)

*Primary Examiner* — Kamini B Patel
(74) *Attorney, Agent, or Firm* — Jaffery Watson Mendonsa & Hamilton LLP (57) ABSTRACT

Systems and methods for enhancing the representation of outliers in a distribution of telemetry data of a monitored system are provided. According to one embodiment, telemetry data of the monitored system may be continuously collected. Frequency values representing a frequency of occurrence of corresponding telemetry data of the collected telemetry data may be generated by aggregating the collected telemetry data. As the vast majority of telemetry data is expected to represent a normal operating state of the system and relatively few, if any, of the telemetry data (e.g., outliers) will be indicative of one or more events of significance, the resulting distribution of the frequency values is highly skewed. In order to facilitate visualization of the distribution that accentuates the outliers, display characteristics may be calculated for the frequency values by applying a visualization model based on a weighted combination of multiple data transformations to each of the frequency values.

20 Claims, 8 Drawing Sheets

(56) References Cited

U.S. PATENT DOCUMENTS

| | | | |
|---|---|---|---|
| 2020/0336503 A1* | 10/2020 | Xu | H04L 63/1425 |
| 2020/0379867 A1* | 12/2020 | Lemberg | G06F 17/18 |
| 2021/0089425 A1* | 3/2021 | Lavi | G06N 3/0454 |
| 2021/0124510 A1* | 4/2021 | Ferreira | G06N 5/04 |
| 2021/0208995 A1* | 7/2021 | de Abreu Pinho | G06N 5/045 |
| 2021/0241035 A1* | 8/2021 | Sutherland | G06K 9/6253 |
| 2021/0281592 A1* | 9/2021 | Givental | G06N 20/10 |
| 2022/0019674 A1* | 1/2022 | Frey | G06N 3/0454 |
| 2022/0046046 A1* | 2/2022 | Rao | G06F 21/577 |
| 2022/0086066 A1* | 3/2022 | Pothireddy | G16Y 10/75 |
| 2022/0114216 A1* | 4/2022 | Brar | G06F 11/3034 |

* cited by examiner

VISUALIZATION OF OUTLIERS IN A HIGHLY-SKEWED DISTRIBUTION OF TELEMETRY DATA

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, NetApp, Inc.

BACKGROUND

Field

Various embodiments of the present disclosure generally relate to data analytics, data science, and data visualization. In particular, some embodiments relate to collection and generation of an interpretable visualization of telemetry data of a distributed storage system.

Description of the Related Art

With the ever expanding growth in data resulting from increased information technology (IT) infrastructure, telemetry data of such IT infrastructure, application traffic, network traffic, and the like, the various insights, trends, data models, and predictive models, among other things, enabled by data analytics and the technological field of data science are becoming increasingly important.

Frequency distributions may be used to organize and visualize raw and/or processed data of a dataset at issue. In some situations, relative frequency is more informative than the actual number of occurrences of respective data values; however, the relative frequency of certain data values may be so small in comparison to that of other data values in the dataset at issue that a small number of occurrences of data values that may be of great importance are "lost in the noise" as a result of their underrepresentation.

SUMMARY

Systems and methods are described for enhancing the representation of outliers in a distribution of telemetry data of a monitored system. According to one embodiment, multiple frequency values, each representing a frequency of occurrence of telemetry data of multiple telemetry data of a monitored system during a period of time, are received. The distribution of the frequency values is highly skewed and a particular event of significance is represented by an outlier of the frequency values. Visualization of the distribution that accentuates the outlier is facilitated by, for each telemetry data: (i) calculating a transform result by applying to the frequency value of the telemetry data a weighted combination of each of multiple data transformations of a visualization model; (ii) calculating a display characteristic associated with the telemetry data based on the transform result and a predetermined base value of the display characteristic; and (iii) causing a display element corresponding to the telemetry data to be presented within a graphical representation of the frequency values in accordance with the display characteristic.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for enhancing the representation of outliers in a distribution of telemetry data of a monitored system. In order to monitor the health and status of information technology (IT) infrastructure, telemetry data, application traffic, network traffic, and the like, are often monitored. In addition to raw data, various insights, trends, data models, and predictive models, and the like are often created from the raw data to provide more insight into IT infrastructure health and operation status. In some cases, frequency distributions may be used to organize and visualize raw and/or processed data of a dataset at issue. In some situations, relative frequency is more informative than the actual number of occurrences of respective data values; however, the relative frequency of certain data values may be so small in comparison to that of other data values in the dataset at issue that a small number of occurrences of data values that may be of great importance are "lost in the noise" as a result of their underrepresentation.

Presenting highly skewed data in a visualization in which small occurrences of data points represent events of significance is a challenge. For example, in the context of a distributed storage system, depending upon the polling interval (e.g., every 500 milliseconds or every second), the number of samples of telemetry data collected may exceed 150,000 samples per monitored component (e.g., storage node, slice service, volume, or block service) over the course of a 24 hour period. While the vast majority of telemetry data may represent a normal operating state of the distributed storage system, a few of the telemetry data may be indicative of an event of significance. A non-limiting example of an event of significance in the context of a distributed storage system is a system performance indicator, for example, as described by a particular system telemetry data, slice service load, indicating one or more data points fall out of an expected range of values, representing normal or expected system performance levels. Other examples of potential events of significance include an imminent need for increased storage, memory, processing, and/or networking capacity, imminent degradation of performance or failure of a storage node or a component a component or a service associated therewith, or the like. As described further below, conventional approaches for displaying graphical depictions (e.g., histograms, heat maps, and frequency plots) of such highly skewed data underrepresent these types of small occurrences, which may result in a failure to adequately inform an administrator of events of significance.

Embodiments described herein seek to improve the technological processes of distributed storage system monitoring and the associated visualization of collected telemetry data by transforming a frequency distribution of the collected telemetry data into an interpretable visualization that accentuates infrequent events.

Various embodiments of the present technology provide for a wide range of technical effects, advantages, and/or improvements to computing systems and components. For example, various embodiments may include one or more of the following technical effects, advantages, and/or improvements: (i) integrated collection and dynamic monitoring IT infrastructure to efficiently identify potential health issues; (ii) unique visualization of infrequently occurring portions of IT infrastructure telemetry; (iii) use of dynamic transformation and visualization models to highlight outliers within telemetry; (iv) closed-loop application of system monitoring and data fusion to provide insights on system health and status, (v) use of a holistic real-time computer analysis to identify important changes in system behavior that may be easily obfuscated using traditional techniques; and/or (vi) use on non-routine and unconventional computer operations to enhance the representation of outliers in a distribution of telemetry data of a monitored system.

According to one embodiment, telemetry data of a distributed storage system may be periodically collected. Frequency values representing a frequency of occurrence of corresponding telemetry data of the collected telemetry data may be generated by aggregating the periodically collected telemetry data. As the vast majority of telemetry data is expected to represent a normal operating state of the distributed storage system and relatively few, if any, of the telemetry data (e.g., outliers) will be indicative of one or more events of significance, the resulting distribution of the frequency values is highly skewed. In order to facilitate visualization of the distribution that accentuates the outliers, display characteristics may be calculated for the frequency values by applying a visualization model based on a weighted combination of multiple data transformations to each of the frequency values. Finally, based on the display characteristics, a graphical representation of the frequency values may be displayed within a graphical user interface (GUI) presented to a user (e.g., an administrative user of the distributed storage system or an administrative user of a managed service provider responsible for managing the distributed storage system).

While embodiments of the present disclosure are described herein with reference to a particular practical application involving monitoring of telemetry data of a distributed storage system and accentuating outliers in a highly-skewed frequency distribution of the telemetry data by applying a visualization model to facilitate presentation of an interpretable visualization of the distribution, embodiments of the present disclosure are applicable to presentation of highly-skewed distributions more generally.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

As used herein, "telemetry data" generally refers to performance, configuration and other system data of a monitored system. Telemetry data may refer to one data point or a range of data points. Non-limiting examples of telemetry data for a distributed storage system include latency, utilization, a number of input output operations per second (TOPS), a slice service (SS) load, Quality of Service (QoS) settings, or any other performance related information.

As used herein, "highly-skewed" generally means that the vast majority of the data points within a particular set exist within a certain range of values and one or more data points in this set of data fall well beyond the boundaries of where the vast majority of the data exist. Another way to think of this is that there are one or more outliers in a frequency distribution of the data that are of great significance.

As used herein, a "data transformation" generally refers to a data transformation function in which each data value, x, is replaced with f(x). Non-limiting examples of data transformations include a logarithmic transformation (e.g., a log proportion transformation), a sum proportion transformation, and an exponential transformation.

As used herein, "slice service load" or "SS load" generally refer to a measure of volume load per storage node of a distributed storage system. IO operations may be throttled by the storage operating system of the distributed storage system depending upon and responsive to observation of the SS load exceeding various predefined or configurable thresholds. An occurrence of such throttling may be a highly infrequent event, but one that would be desirable for an administrator to be able to visually ascertain with reference to a graphical representation of a highly-skewed distribution of SS load values or ranges.

As used herein, a "display characteristic" generally refers to a characteristic or property of a display element of a graphical representation. Non-limiting examples of display characteristics include opacity, brightness, color (foreground or background), luminance, saturation, length, width, height, and the like. Non-limiting examples of display elements include a set of one or more pixels, an element of a graphical representation of a distribution of numerical data, a portion of a bar of a vertical stacked bar chart, a portion of a bar of a horizontal grouped bar chart, a portion of a bar of a histogram, a sector of a pie chart, and the like.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

Figure 1:
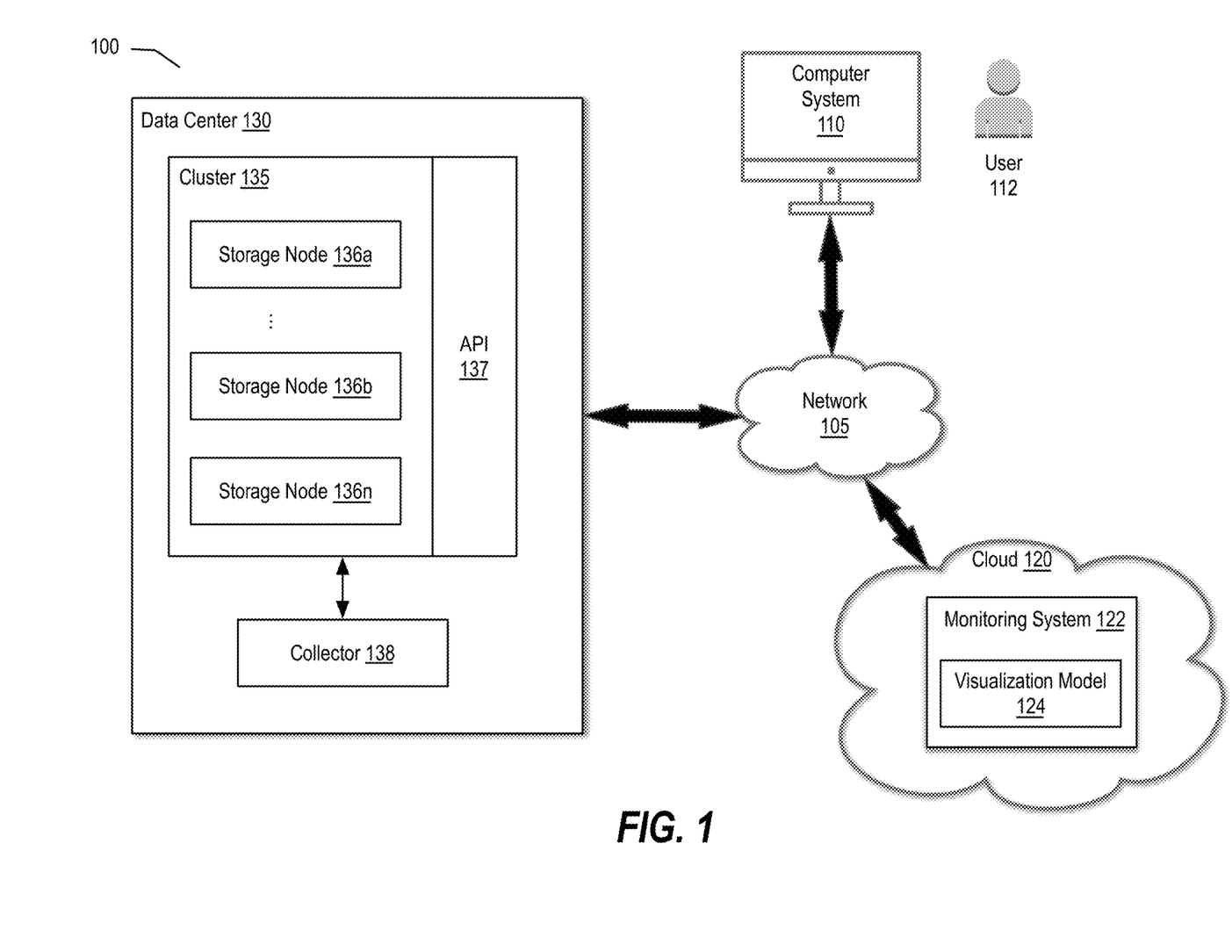
FIG. 1 is a block diagram illustrating an environment in which various embodiments may be implemented.

FIG. 1 is a block diagram illustrating an environment 100 in which various embodiments may be implemented. In various examples described herein, an administrator (e.g. user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on computer system 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a computer system 110, and a user 112. The data center 130, the cloud 120, and the computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a collector 138. Those of ordinary skill in the art will appreciate additional IT infrastructure would typically be part of the data center 130; however, discussion of such additional IT infrastructure is unnecessary to the understanding of the various embodiments described herein.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

The API 137 may provide an interface through which the cluster 135 is configured and/or queried by external actors (e.g., the collector 138, the computer system 110, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storge node level, or the storage node component level).

In various examples described herein, the collector 138 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Y seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system. Additional details regarding example functionality of the collector 138 are described below with reference to FIG. 4.

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system (e.g., monitoring system 112). The monitoring system 122 may periodically receive monitored information, including raw and/or processed telemetry data (e.g., frequency distributions representing aggregated telemetry data over time) of multiple clusters (e.g., cluster 135) from multiple distributed collectors (e.g., collector 138) operable within respective data centers (e.g., data center 130) of one or more customers of the managed service provider. Depending upon the particular implementation, the monitored information may be pushed from the collector 138 or pulled from the collector 138 in accordance with a monitoring schedule or responsive to an event (e.g., a request issued by user 112 to the monitoring system 112).

As noted above, the monitored information may represent hundreds of thousands of observations (samples) of telemetry data over a period of time in which the vast majority of telemetry data may represent normal operating conditions, but a small number of occurrences (e.g., telemetry data exceeding certain thresholds) may be indicative of events of significance (e.g., an abnormal condition, imminent need for increased storage capacity, imminent failure of a storage node 136, or the like). As discussed further below with reference to FIG. 3, low frequency observations may be unrepresented in highly-skewed distributions and this under-representation may be propagated to corresponding attempts to generate interpretable visualizations of such highly-skewed distributions via conventional approaches, thereby creating a risk that important, but infrequent events may be unnoticed. As such, there is a need in the technological fields of data science, monitoring of distributed systems, and data visualization for improved visualization approaches to accentuate underrepresented data.

In one embodiment, the monitoring system 122 includes a visualization model 124 to facilitate visualization of the monitored information. Depending upon the particular implementation, some aspects of the visualization model (e.g., determination and/or configuration of tuning parameters) may be performed and/or applied by the monitoring system 122 and other aspects of the visualization model may be performed and/or applied by the computer system 110, for example, by a web browser running on the computer system 110 performing dynamic code execution of code (e.g., JavaScript) delivered to the browser and embedded within a web page (e.g., a Hypertext Markup Language (HTML) file) by or on behalf of the monitoring system 122. A non-limiting example of improved distribution visualization processing is described below with reference to FIG. 5.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Example Storage Node

Figure 2:
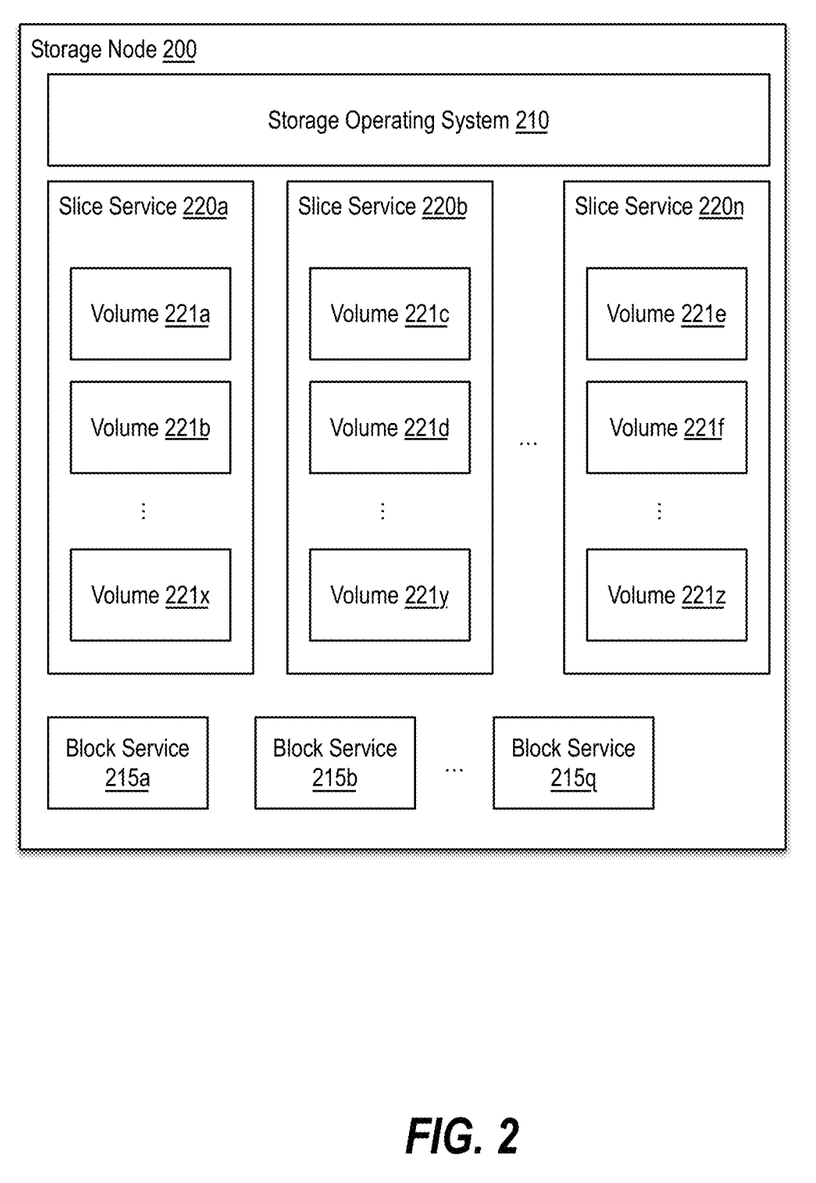
FIG. 2 is a block diagram illustrating a storage node in accordance with an embodiment of the present disclosure.

FIG. 2 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200

As noted above, in some embodiments, a collector module (e.g., collector 138) may poll an API (e.g., API 137) of a distributed storage system (e.g., cluster 135) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

Underrepresentation of Low Frequency Values

Figure 3:
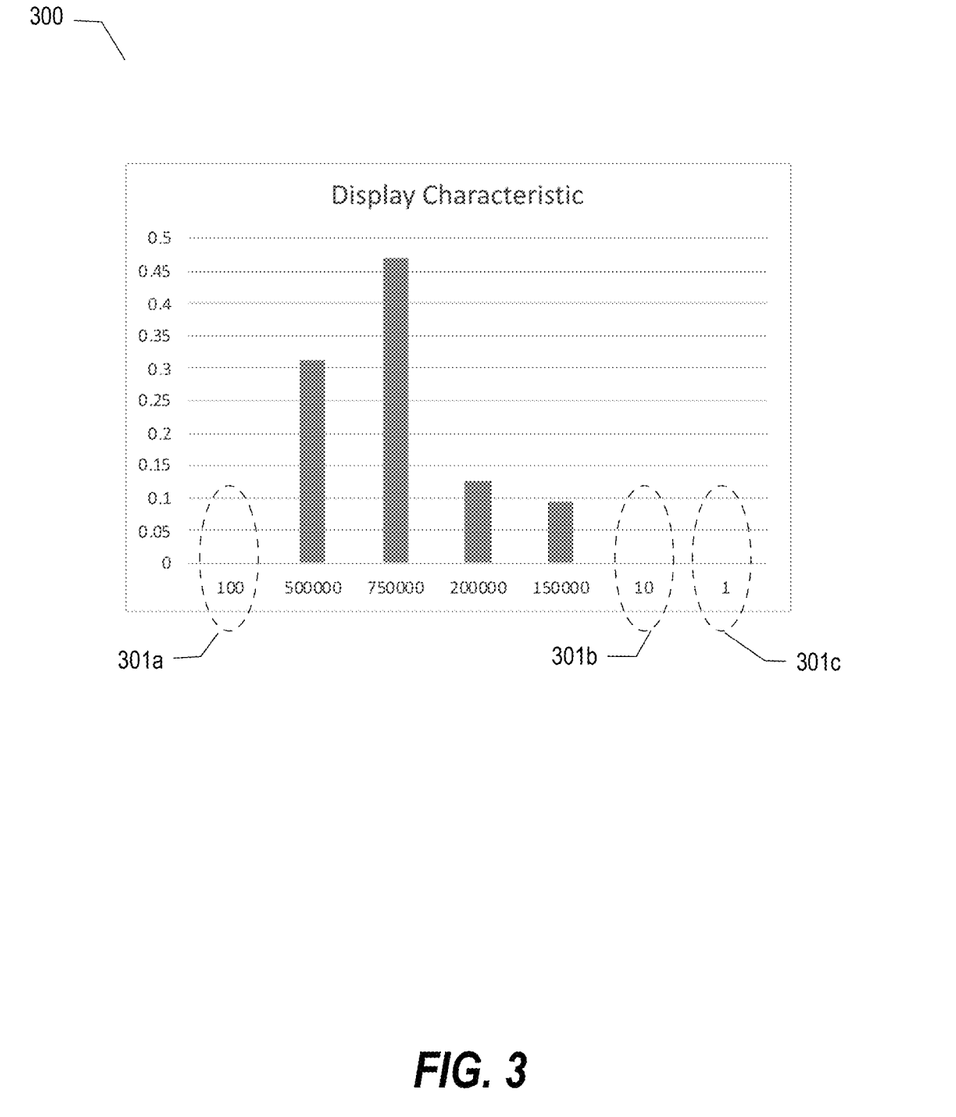
FIG. 3 is a bar chart illustrating underrepresentation of low frequency values of a frequency distribution.

FIG. 3 is a bar chart 300 illustrating underrepresentation of low frequency values of a frequency distribution. In the context of the present example, bar chart 300 represents values of a display characteristic calculated for the frequency values in Table 1 (below). In Table 1, the value of the display characteristic is represented by a sum proportion data transformation in which the frequency value for a particular telemetry data value or range is divided by the total number of observations based on the following equation:

$$\text{Sum Proportion} = F/(\Sigma_{i=i}^{n} F_i) \qquad \text{EQ \#1}$$

where,

F is the particular frequency value; and $F_i$ is the ith frequency value of the batch of frequency values at issue.

As such, the display characteristic values for relatively low frequency observations (e.g., 301a-c) corresponding to frequency values 100, 10, and 1, respectively, in Table 1 are underrepresented due to the high number of total observations.

TABLE 1

Display Characteristic Value Based on Frequency and Total Observations

| Frequency | Total Observations | Display Characteristic Value |
|---|---|---|
| 100 | 1,600,111 | .00006 |
| 500,000 | 1,600,111 | .31248 |
| 750,000 | 1,600,111 | .46871 |
| 200,000 | 1,600,111 | .12499 |
| 150,000 | 1,600,111 | .09374 |
| 10 | 1,600,111 | .000006 |
| 1 | 1,600,111 | .0000006 |

The storage nodes (e.g., storage nodes 136a-n and storage node 200), the collector (e.g., collector 138), and the monitoring system (e.g., monitoring system 122) described herein, and the processing described below with reference to the flow diagrams of FIGS. 4-5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 8 below.

Telemetry Data Monitoring

Figure 4:
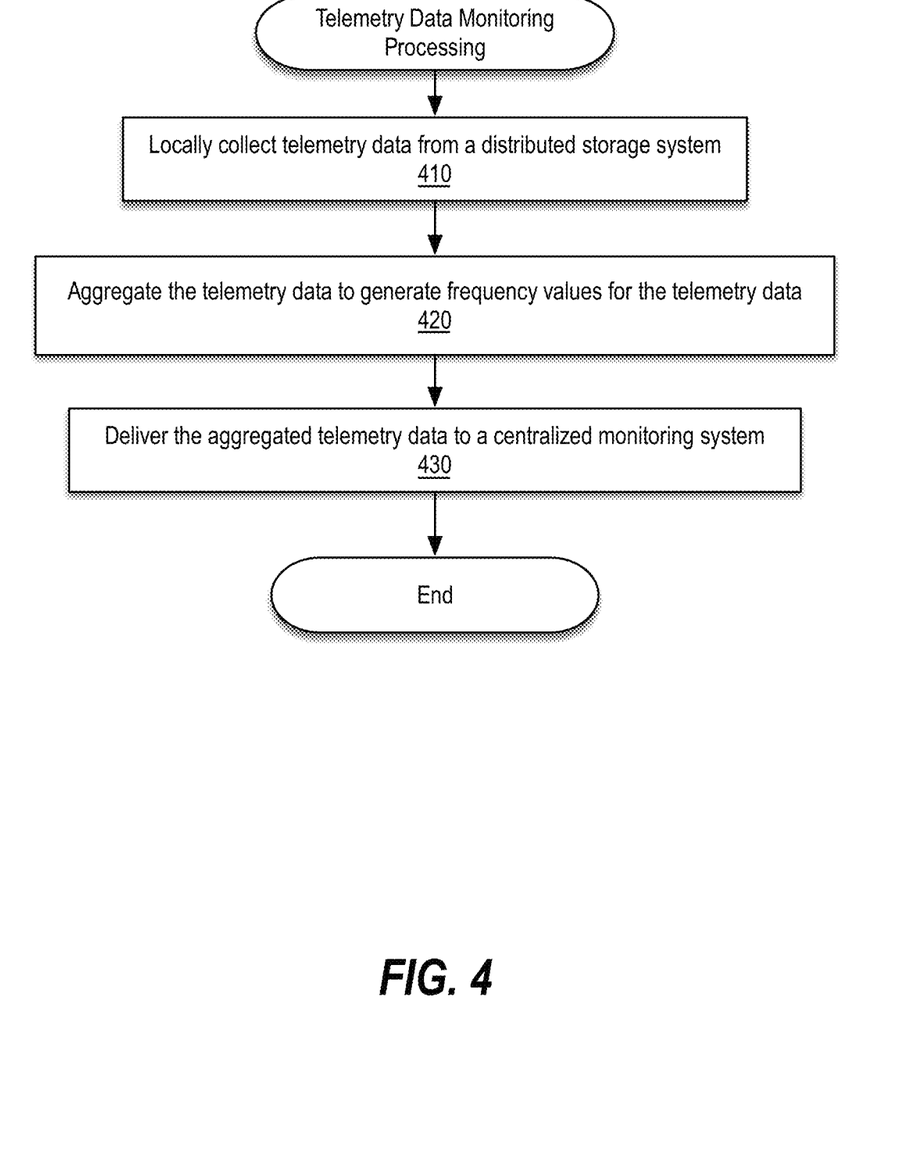
FIG. 4 is a flow diagram illustrating telemetry data monitoring in accordance with an embodiment of the present disclosure

FIG. 4 is a flow diagram illustrating telemetry data monitoring in accordance with an embodiment of the present disclosure. In various embodiments described herein, the telemetry data monitoring may involve various aspects being performed by a pipeline of processes distributed across one or more computer systems or modules (e.g., collector 138 and a monitoring system 122). In alternative embodiments, aspects of the pipeline may be performed by more or fewer computer systems or modules.

At block 410, telemetry data is locally collected from a distributed storage system. For example, a collector (e.g., collector 138) operable within the same data center (e.g., 130) in which the distributed storage system (e.g., cluster 135) resides may periodically poll an API (e.g., API 137) of the cluster. In one embodiment, the telemetry data collection (polling) interval may be a predefined or configurable value that may be controlled by an administrative console (e.g., computer system 110).

At block 420, the telemetry data is aggregated to generate frequency values or the telemetry data. According to one embodiment, the collector may generate data representing a frequency distribution based on the number of observations for discrete values or ranges of telemetry data collected from the distributed storage system. For example, a frequency count for each occurrence of a particular data value or particular data values falling within a predefined or configurable range may be updated responsive to each new batch of telemetry data received from the distributed system.

At block 430, the aggregated telemetry data is delivered to a centralized monitoring system. According to one embodiment, in order to facilitate remote monitoring of multiple managed distributed storage systems, a cloud-based monitoring system (e.g., monitoring system 122) periodically pulls statistical data relating to the telemetry data aggregated by the collector to provide a centralized data store from which the multiple managed distributed storage systems may be monitored remotely, individually or in various combinations. Alternatively, the collectors may periodically push the statistical data to the cloud-based monitoring system or the statistical data may be pushed or pulled responsive to an event (e.g., a request by an administrator).

In one embodiment, telemetry data is gathered constantly by polling the API, resulting in near-real-time updates to the monitoring system. Depending upon the particular implementation, different types of telemetry data may be polled and aggregated at different intervals. For example, the SS load telemetry data may be aggregated over a period of hours or days.

Visualization Processing

Figure 5:
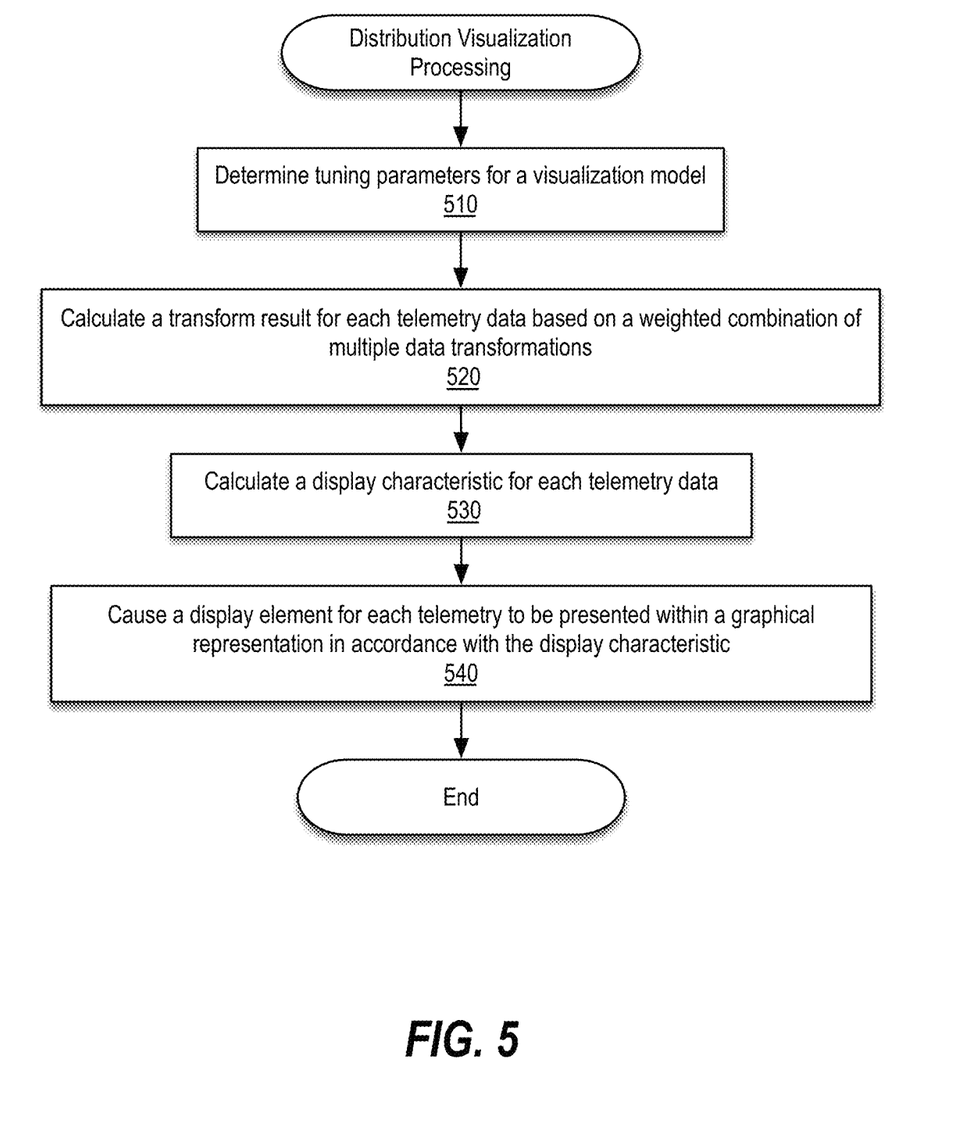
FIG. 5 is a flow diagram illustrating distribution visualization processing in accordance with an embodiment of the present disclosure.

FIG. 5 is a flow diagram illustrating distribution visualization processing in accordance with an embodiment of the present disclosure. Depending upon the particular implementation some portion or all of the distribution visualization processing may be performed by a centralized monitoring system (e.g., monitoring system 122) and/or a remote administrative station (e.g., computer system 110).

At block 510, tuning parameters are determined for a visualization model. According to one embodiment, the visualization model (e.g., visualization model 124) is based on based on a weighted combination of multiple data transformations (e.g., (i) a log proportion representing a proportion of the log of a particular frequency value with respect to the sum of the logs of all frequency values for a particular batch of telemetry data at issue and (ii) a sum proportion representing a proportion of a particular frequency value with respect to the sum of all frequency values at issue). According to one embodiment, the tuning parameters include a weighting factor for each of the multiple data transformations (in which the sum of the weighting factors is 1) and a base value for the display characteristic. Depending upon the particular implementation, the tuning parameters may be established and stored as part of a configuration file used by the monitoring system and different sets of tuning parameters may be used for different types of telemetry data. In one embodiment, some subset of the tuning parameters may be dynamically adjusted based on the type of telemetry data and/or frequency of the telemetry data or reconfigured, for example, based on input from the administrator. Empirical data suggests, when performing a weighted combination of the log proportion data transformation and the sum proportion data transformation, a suitable weighting factor for the log proportion data transformation is 0.65 and a suitable weighting factor for the sum proportion data transformation is 0.35; however, the weighting factor for the log proportion data transformation may be any value between 0.5 and 0.8, inclusive, and the weighting factor for the sum proportion data transformation may be any value between 0.2 and 0.5, inclusive. Depending upon the desired accentuation of the data at issue and the particular combination of data transformations, different weighting factors may be employed.

At block 520, a transform result is calculated for each telemetry data based on a weighted combination of multiple data transformations. According to one embodiment, the transform result for a particular telemetry data (e.g., point or range) at issue is calculated as in accordance with the following equation:

$$\text{Transform Result} = \Sigma_{i=i}^{n} W_i * DT_i \quad \text{EQ \#2}$$

where, n is the number of data transformations being combined;

$W_i$ is the weighting factor for the ith data transformation; and $DT_i$ is represents a result of applying the ith data transformation to the frequency value for the particular telemetry data at issue.

According to one embodiment, an intermediate transform result (e.g., $W_i * DT_i$) is calculated for each of the multiple data transformations by multiplying the weighting factor for the particular data transform by the result of applying the data transformation function to the frequency value for the particular telemetry data. Then, the transform result may be determined for the particular telemetry data by summing the intermediate transform results. According to one embodiment, dynamically executable code (e.g., JavaScript) performing an algorithm involving EQ #2 may be injected by or on behalf of the centralized monitoring system into a web page to be displayed by the remote administrator station.

At block 530, a display characteristic is calculated for each telemetry data. According to one embodiment, an opacity value between 0 and 1, inclusive is determined for a display element that will represent a particular telemetry data based on the following equation:

$$\text{Opacity} = \text{Transform Result} * (1-\text{Base Opacity}) * \text{Base Opacity} \quad \text{EQ \#3}$$

where,

Transform Result is the transform result for the particular telemetry data calculated in block 520; and Base Opacity is the base value for the display characteristic determined in block 510 (e.g., a base value of 0.05 or another value between 0.075 and 0.025, inclusive).

According to one embodiment, dynamically executable code (e.g., JavaScript) performing an algorithm involving EQ #2 and EQ #3 may be injected by or on behalf of the centralized monitoring system into a web page representing a to be displayed by the remote administrator station.

At block 540, a display element is presented for each telemetry data within a graphical representation in accordance with the display characteristic. According to one embodiment, the graphical representation is a graph or a chart that provides an interpretable visualization of the distribution that, as a result of application of EQ #2 and EQ #3, accentuates outliers (e.g., 301*a-c*) within the distribution. A non-limiting example of the graphical representation is described further below with reference to FIG. 7.

Figure 6:
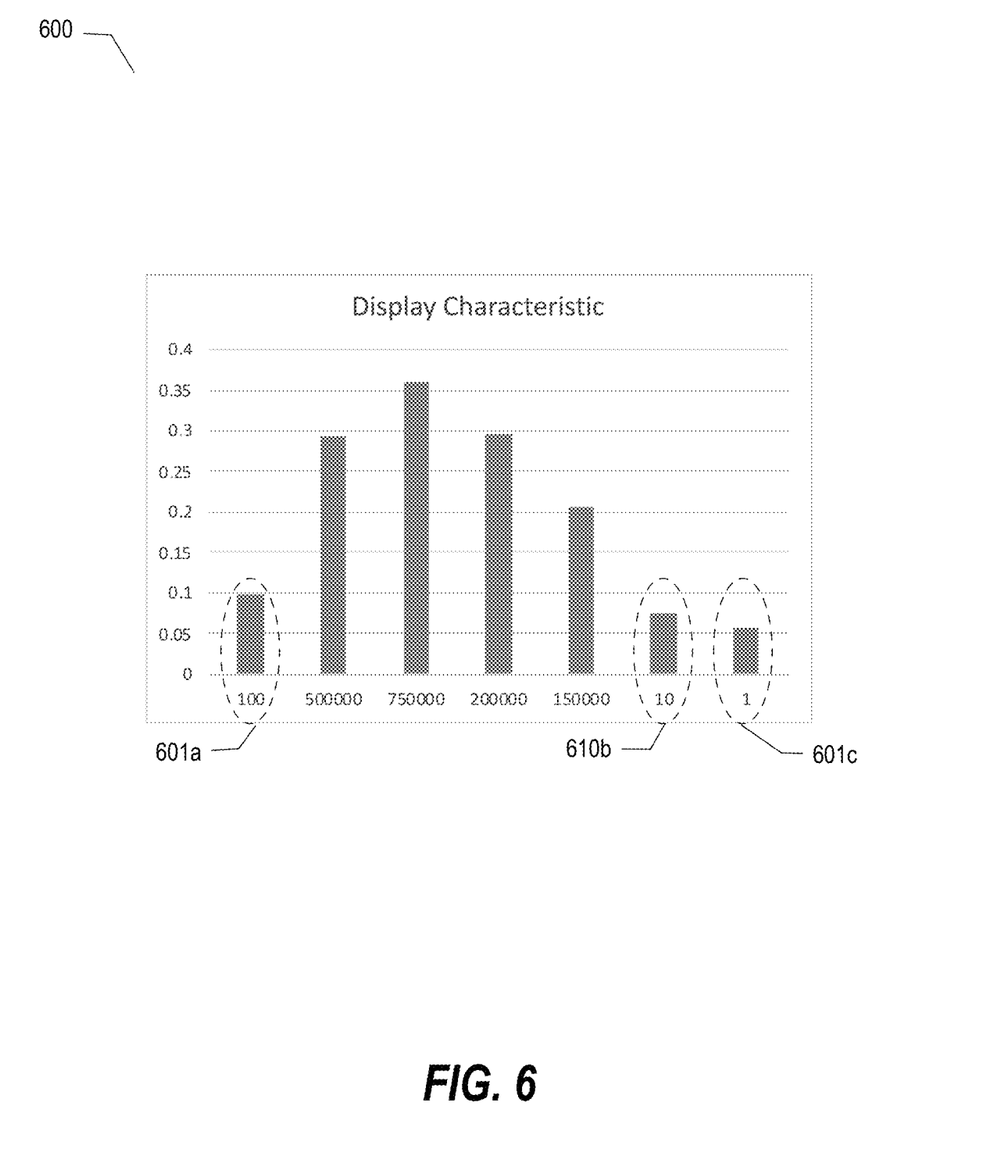
FIG. 6 is a bar chart illustrating accentuation of low frequency values of a frequency distribution in accordance with an embodiment of the present disclosure.

FIG. 6 is a bar chart illustrating accentuation of low frequency values of a frequency distribution in accordance with an embodiment of the present disclosure. In the context of the present example, bar chart 600 represents values of a display characteristic calculated for the frequency values in Table 2 (below). In Table 2, the value of the display characteristic for a particular telemetry data value or range is represented by a weighted combination of a sum proportion data transformation applied to the frequency value of the particular telemetry data and a log proportion data transformation applied to the frequency value of the particular telemetry data based on the following equation:

$$\text{Display Characteristic} = W_1 * \text{SP} + W_2 * \text{LP} * (1-\text{Base}) + \text{Base} \quad \text{EQ \#4}$$

where, $W_1$ is the weighting factor for the sum proportion (SP) of the particular frequency value;

$W_2$ is the weighting factor for the log proportion (LP) of the particular frequency value; and Base is the base value for the display characteristic (e.g., opacity).

As can be seen with reference to Table 2 and bar chart 600 the display characteristic values for relatively low frequency observations (e.g., 601*a-c*) corresponding to frequency values 100, 10, and 1, respectively, in Table 2 have now been significantly enhanced over the corresponding display characteristic values of Table 1 and bar chart 300 of FIG. 3.

TABLE 2

| | Display Characteristic Value Based on Weighted Combination of LP and SP | | | |
|---|---|---|---|---|
| Frequency | Log | Log Proportion | Sum Proportion | Display Characteristic Value |
| 100 | 4.615120517 | 0.078916805 | .00006 | 0.098751907 |
| 500,000 | 13.12236538 | 0.224387456 | .31248 | 0.292458296 |
| 750,000 | 13.527829982 | 0.251139903 | .46871 | 0.360937194 |
| 200,000 | 12.20607765 | 0.299584558 | .12499 | 0.295447405 |
| 150,000 | 11.91839724 | 0.203800059 | .09374 | 0.207016249 |
| 10 | 2.3997895273 | 0.041003097 | .000006 | 0.07532149 |
| 1 | 0.693147181 | 0.011852553 | .0000006 | 0.057319159 |

Figure 7:
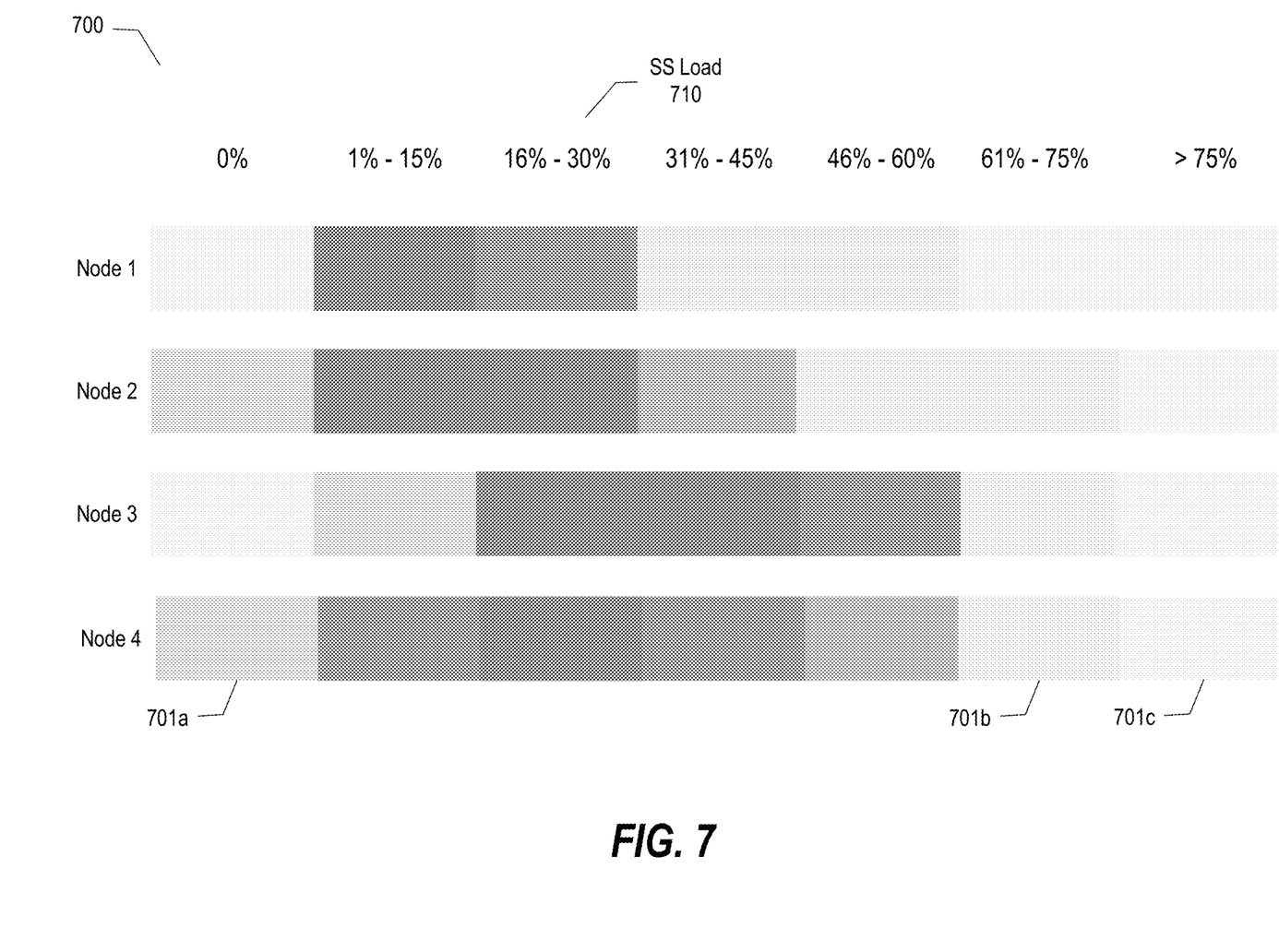
FIG. 7 is a histogram representing frequency distributions of telemetry data of storage nodes of a distributed storage system in accordance with an embodiment of the present disclosure.

FIG. 7 is a histogram 700 representing frequency distributions of telemetry data of storage nodes of a distributed storage system in accordance with an embodiment of the present disclosure. According to one embodiment, the histogram 700 may be displayed via a browser-based interface through which one or more distributed storage systems (e.g., cluster 135) may be managed by a managed service provider or an administrator of the customer. In the context of the present example, the histogram 700 represents frequency of occurrence of various ranges of an SS load 710 in which the more frequently an SS load value within the range at issue is observed, the more opaque the corresponding data element is.

Based on the display characteristic values listed above in Table 1 and as shown in the bar chart 300 of FIG. 3, low frequency observations (e.g., 801*a-c*) corresponding to frequency values 100, 10, and 1, respectively, without application of the visual model described herein would have corresponding display characteristics (e.g., opacity values) of 0. As such, there would be no visual indication regarding the existence of such low frequency observations. In contrast, based on the display characteristic values listed above in Table 2 and as shown in the bar chart 600 of FIG. 6, the representation of the low frequency observations (e.g., 801*a-c*) is enhanced by the visual model and the resulting visualization accentuates the low frequency observations. For example, in one embodiment, the visualization model assigns a base display characteristic to any telemetry data having a non-zero frequency value and linearly increases the value of the display characteristic for incremental increases in the frequency value thereafter.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
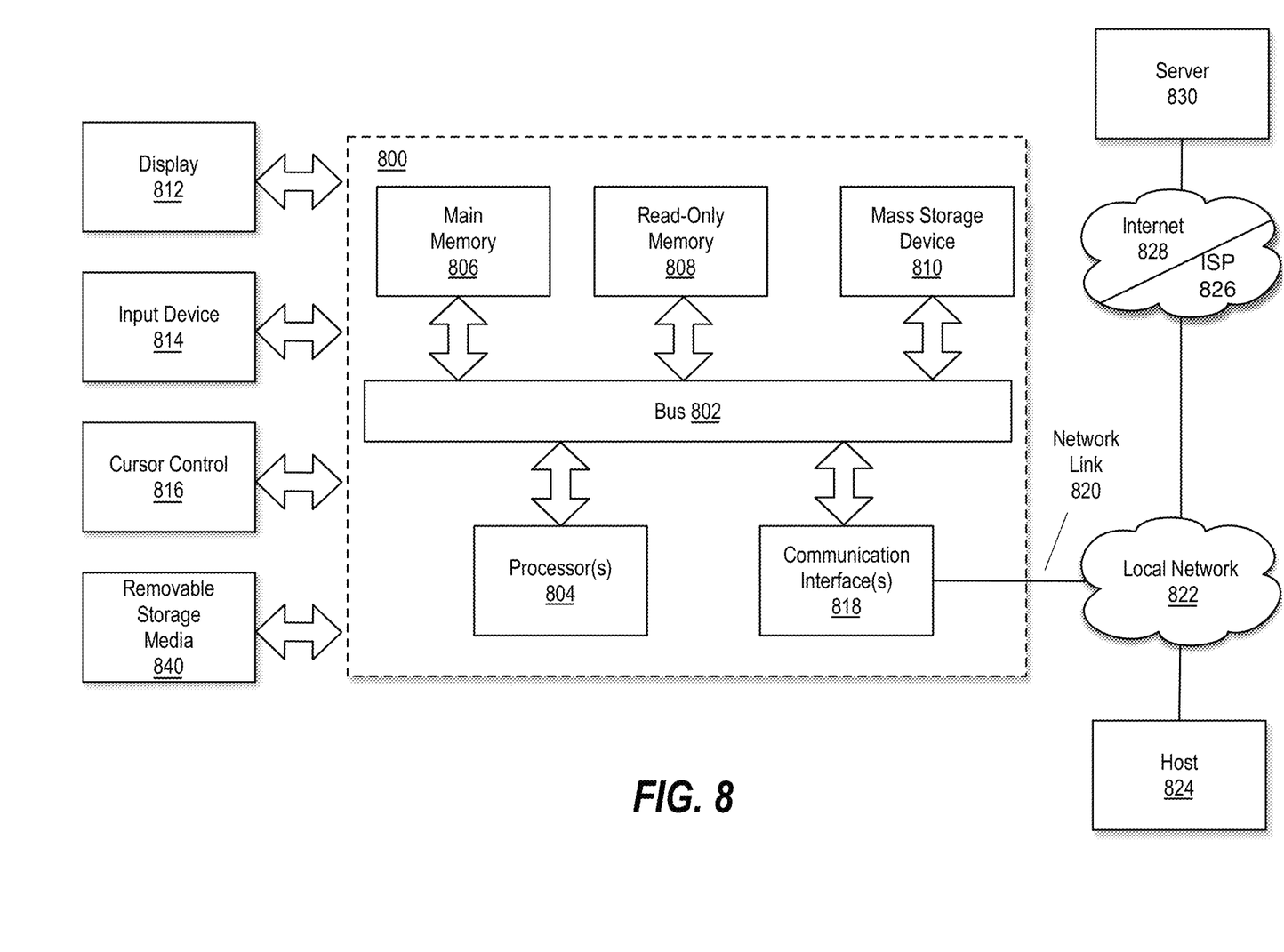
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources associated with a storage node (e.g., storage node 136), a collector (e.g., collector 138), a monitoring system (e.g., monitoring system 122) or an administrative work station (e.g., computer system 110). Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., a hardware processor 804) coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

What is claimed is:

1. A method performed by one or more processing resources of one or more computer systems, the method comprising:
periodically collecting telemetry data of a distributed storage system;
generating a plurality of frequency values representing a frequency of occurrence of corresponding telemetry data of a plurality of telemetry data by aggregating the periodically collected telemetry data, wherein a distribution of the plurality of frequency values is highly skewed, and wherein a particular event of significance is represented by an outlier of the plurality of frequency values; and
causing a remote computer system to:
facilitate visualization of the distribution that accentuates the outlier including generating display characteristics for the plurality of frequency values by applying a model to each of the frequency values, wherein the model is based on a weighted combination of a plurality of data transformations; and
present a graphical representation of the plurality of frequency values based on the display characteristics.

2. The method of claim 1, wherein said periodically collecting telemetry data includes polling an Application Programming Interface (API) of the distributed storage system by a collection system running within a data center in which the distributed storage system resides.

3. The method of claim 1, further comprising delivering the plurality of frequency values and corresponding telemetry data to a centralized monitoring system accessible to the remote computer system.

4. The method of claim 1, wherein said generating display characteristics for the plurality of frequency values is performed by a browser running on the remote computer system performing dynamic code execution.

5. The method of claim 1, wherein a data transformation of the plurality of data transformations comprises a logarithmic transformation or a sum proportion transformation.

6. The method of claim 1, wherein the display characteristics comprise an opacity value for each of the plurality of frequency values.

7. The method of claim 1, wherein the plurality of telemetry data comprise slice service load metrics.

8. A method performed by one or more processing resources of one or more computer systems, the method comprising:

receiving a plurality of frequency values each representing a frequency of occurrence of telemetry data of a plurality of telemetry data of a monitored system during a period of time,
  wherein a distribution of the plurality of frequency values is highly skewed, and
  wherein a particular event of significance is represented by an outlier of the plurality of frequency values; and
facilitating visualization of the distribution that accentuates the outlier by, for each telemetry data of the plurality of telemetry data:
  calculating a transform result by applying a weighted combination of each of a plurality of data transformations of a visualization model to the frequency value of the telemetry data;
  calculating a display characteristic associated with the telemetry data based on the transform result and a predetermined base value of the display characteristic; and
  causing a display element corresponding to the telemetry data to be presented within a graphical representation of the plurality of frequency values in accordance with the display characteristic.

9. The method of claim 8, further comprising determining a plurality of tuning parameters for the visualization model to enhance representation of the outlier among the plurality of frequency values, wherein the plurality of tuning parameters include a weighting factor for each of the plurality of data transformations and wherein said calculating a transform result comprises for each data transformation of the plurality of data transformations calculating an intermediate transform result based on the data transformation, the weighting factor for the data transformation, and the frequency value of the telemetry data.

10. The method of claim 8, wherein a data transformation of the plurality of data transformations comprises a logarithmic transformation or a sum proportion transformation.

11. The method of claim 8, wherein said facilitating visualization of the distribution that accentuates the outlier includes a browser performing dynamic code execution.

12. The method of claim 8, wherein the display characteristic comprises opacity.

13. The method of claim 8, wherein the graphical representation comprises a histogram.

14. A system comprising:
  a processing resource; and
  a non-transitory computer-readable medium, coupled to the processing resource, having stored therein instructions that when executed by the processing resource cause the processing resource to:
    receive a plurality of frequency values each representing a frequency of occurrence of telemetry data of a plurality of telemetry data of a monitored system during a period of time, wherein a distribution of the plurality of frequency values is highly skewed, and wherein a particular event of significance is represented by an outlier of the plurality of frequency values; and
    facilitate visualization of the distribution that accentuates the outlier by, for each telemetry data of the plurality of telemetry data:
      calculating a transform result by applying a weighted combination of each of a plurality of data transformations of a visualization model to the frequency value of the telemetry data;
      calculating a display characteristic associated with the telemetry data based on the transform result and a predetermined base value of the display characteristic; and
      causing a display element corresponding to the telemetry data to be presented within a graphical representation of the plurality of frequency values in accordance with the display characteristic.

15. The system of claim 14, wherein a data transformation of the plurality of data transformations comprises a logarithmic transformation or a sum proportion transformation.

16. The system of claim 14, wherein visualization of the distribution is facilitated by a browser running on the system performing dynamic code execution.

17. The system of claim 14, wherein the display characteristic comprises opacity.

18. A non-transitory computer-readable storage medium embodying a set of instructions, which when executed by a processing resource cause the processing resource to:
  receive a plurality of frequency values each representing a frequency of occurrence of telemetry data of a plurality of telemetry data of a monitored system during a period of time, wherein a distribution of the plurality of frequency values is highly skewed, and wherein a particular event of significance is represented by an outlier of the plurality of frequency values; and
  facilitate visualization of the distribution that accentuates the outlier by, for each telemetry data of the plurality of telemetry data:
    calculating a transform result by applying a weighted combination of each of a plurality of data transformations of a visualization model to the frequency value of the telemetry data;
    calculating a display characteristic associated with the telemetry data based on the transform result and a predetermined base value of the display characteristic; and
    causing a display element corresponding to the telemetry data to be presented within a graphical representation of the plurality of frequency values in accordance with the display characteristic.

19. The non-transitory computer-readable storage medium of claim 18, wherein a data transformation of the plurality of data transformations comprises a logarithmic transformation or a sum proportion transformation.

20. The non-transitory computer-readable storage medium of claim 18, wherein the display characteristic comprises opacity.

* * * * *